United States Patent [19]

Burrows

[11] 3,910,176
[45] Oct. 7, 1975

[54] APPARATUS FOR STERILIZING MEAT PRODUCTS AND METHOD OF USING SAME

[76] Inventor: Sherman D. Burrows, 1737 Catalina Ave., Seal Beach, Calif. 90740

[22] Filed: Oct. 19, 1973

[21] Appl. No.: 407,828

[52] U.S. Cl. .................. 99/477; 99/361; 99/362; 99/467
[51] Int. Cl.² ............................................. A23L 3/32
[58] Field of Search ........................ 99/467–470, 99/473, 477, 361, 362

[56] References Cited
UNITED STATES PATENTS
2,035,619  3/1936  Robison ............................. 99/470
3,608,475  9/1971  Scott ................................. 99/362

Primary Examiner—Peter Feldman
Assistant Examiner—James A. Niegowski
Attorney, Agent, or Firm—William C. Babcock

[57] ABSTRACT

An apparatus and method of using same to render meat products contaminated with harmful microorganisms fit for human consumption.

The apparatus is of such design and structure that a zone of high electrical potential is established through which the contaminated meat products are sequentially moved. The magnitude of electrical potential and the rate of movement of meat products therethrough are so corrolated that the cell structures of the microorganisms in the meat products are killed or at the least damaged to the extent that these microorganisms cannot reproduce and subsequently die. After the meat products have passed through the zone of high electrical potential, the meat products are sterilized and then are preferably directed through a bacteria free environment to be placed in sterile containers or directed to refrigerated storage space.

5 Claims, 8 Drawing Figures

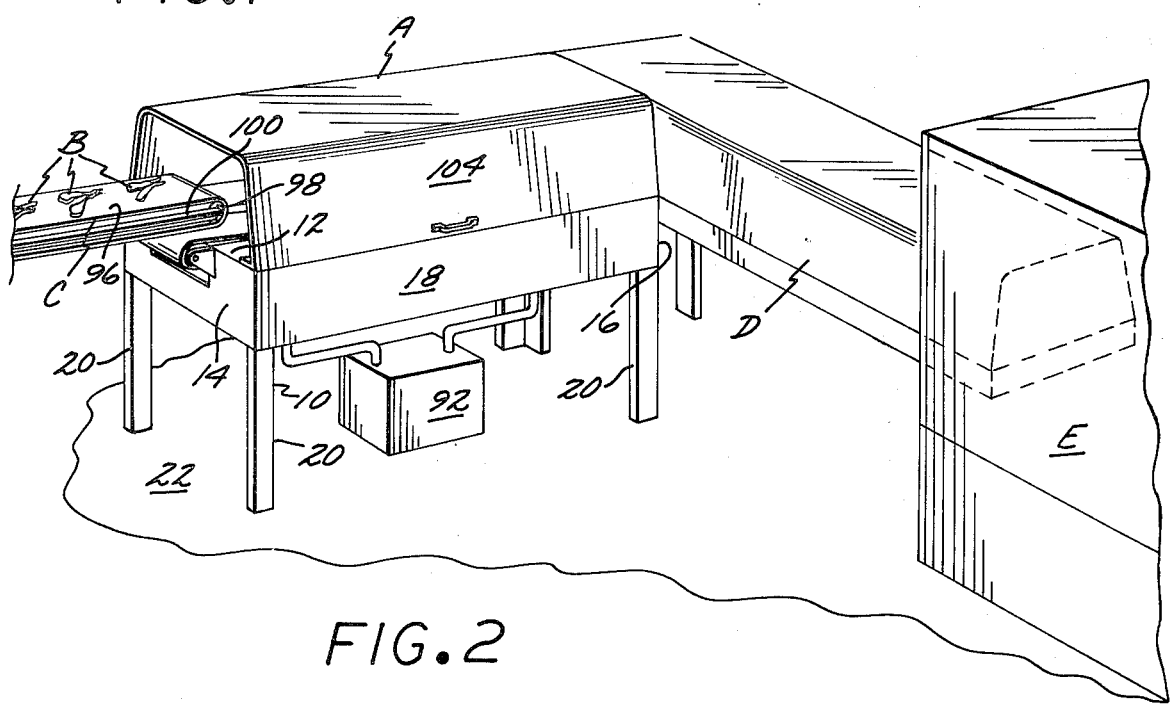
FIG. 1
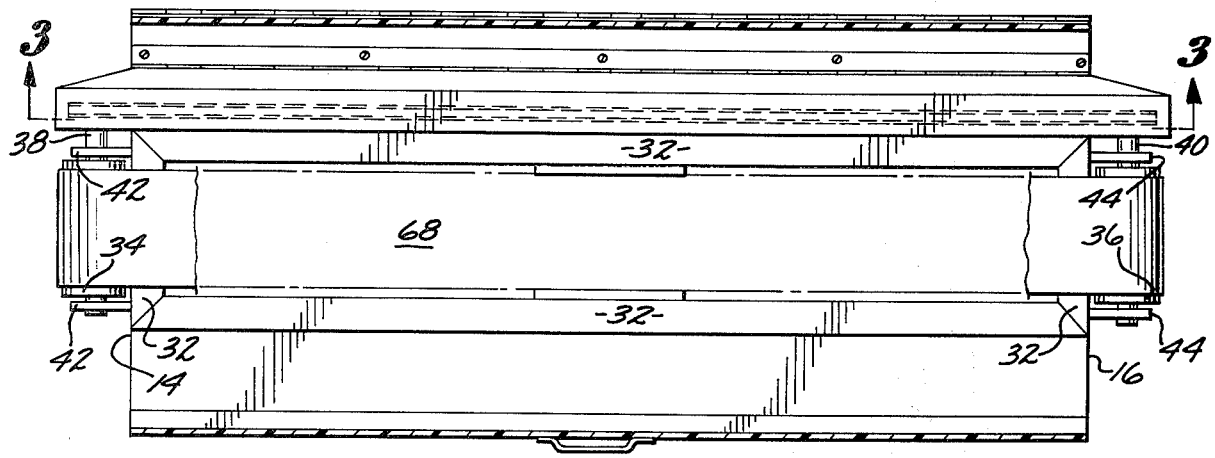
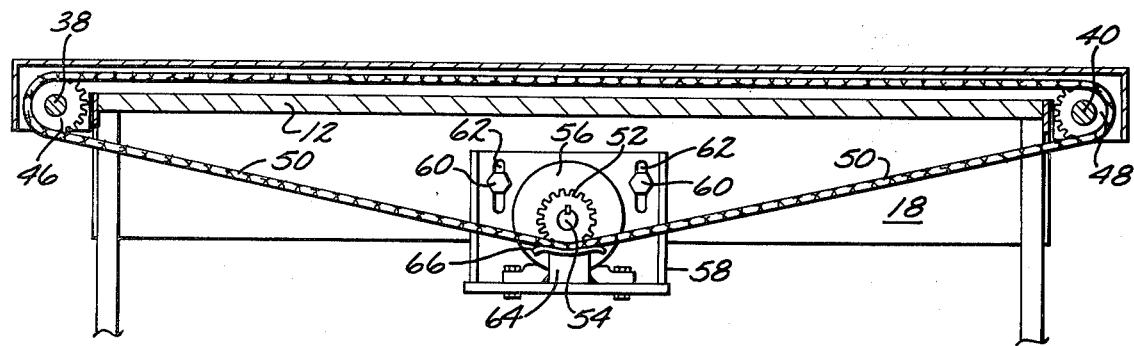
FIG. 3

APPARATUS FOR STERILIZING MEAT PRODUCTS AND METHOD OF USING SAME

BACKGROUND OF THE INVENTION

1. Field of the Invention

Apparatus for sterilizing meat products and method of using same.

2. Description of the Prior Art

Numerous meat products are shipped to the United States with the expectation that they will be permitted entry into this country for subsequent sale. Such food products before being admitted entry into the United States are examined to determine whether they are contaminated with harmful microorganisms, such as *salmonella*, *staphylococcus aureus*, and *escherichia coli*. If the meat products are found to be contaminated with harmful microorganisms they are not permitted entry into the United States. When such entry is refused the producer of the food products is not only put to the expense of shipping the food products to the United States, but the additional expense of reshipping the food products to the country of origin or another country that will admit such products.

The primary object in devising the present invention is to supply an apparatus and method of using the same to render meat products contaminated with harmful microorganisms fit for human consumption.

Another object of the invention is to minimize the expense to which producers and importers are now subjected when the meat products which they endeavor to import into the United States are rejected for containing harmful microorganisms.

A further object of the invention is to provide means for destroying harmful microorganisms in meat products to the extent that the microorganisms cannot reproduce, and the meat products as a result being sterilized and fit for human consumption.

SUMMARY OF THE INVENTION

The invention includes an elongate tank that has first and second ends and a bottom, with the tank capable of holding a liquid aqueous medium, perferably water. Two laterally spaced electrodes are disposed in the tank intermediate the first and second ends thereof and are electrically insulated from one another. First and second rollers are rotatably supported adjacent the first and second ends of the tank. An endless flexible belt of a non-electrical conducting material is rotatably supported from the first and second rollers.

The belt includes an upper reach that extends the length of the tank, and slidably rests on the bottom thereof. Power means are provided for driving the first and second rollers, and the belt supported rotatably thereon. Electric power is supplied to the two electrodes to establish a zone of substantial electrical potential therebetween, and the food products being sequentially moved through this zone as the endless belt is driven. The rate of movement of the belt and the food product supported thereon is such that as each food product moves through the zone the electrical potential destroys the harmful microorganism to the extent that these microorganisms are either killed immediately or damaged to the extent that they cannot reproduce and subsequently die. Thus, the meat products after passing through the zone of electrical potential is sterilized, and the meat products thereafter being moved through a bacteria free environment to be packaged in sterile containers, or directed to refrigerated storage space.

In the use of the above described apparatus, the meat products are sequentially placed on the upper reach of the conveyor belt adjacent the first end of the tank, and the tank being of sufficient depth that the entire body of the meat products passes through the electrical potential zone between the two electrodes as the meat products move towards the second end of the tank.

BRIEF DESCRIPTION OF THE DRAWINGS

FIG. 1 is a perspective view of the meat product sterilizing device, together with a first power driven conveyor for sequentially delivering meat products to the device, and a second power driven conveyor for receiving the sterilized meat products for delivery to a sterile packaging unit, or if desired, to a refrigerated storage space;

FIG. 2 is a top plan view of the meat product sterilizing device;

FIG. 3 is a longitudinal cross sectional view of the meat sterilizing device takn on the line 3—3 of FIG. 2;

DESCRIPTION OF THE PREFERRED EMBODIMENT

Figure 4:
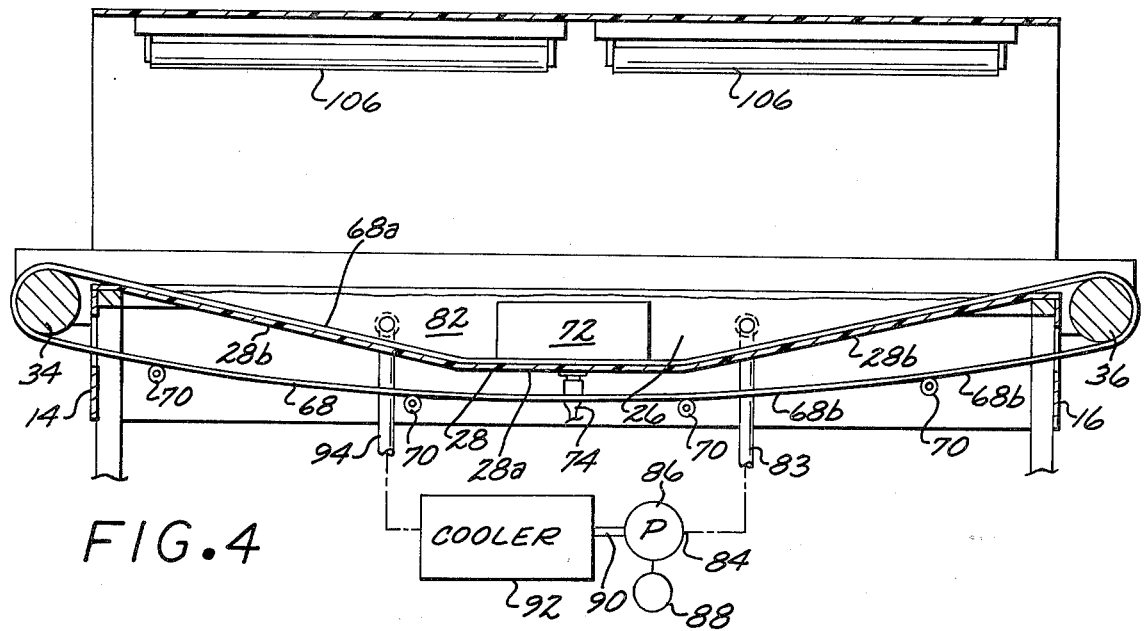
FIG. 4 is a vertical cross sectional view of the sterilizing device.

The meat product sterilizing device A as can best be seen in FIG. 1 is sequentially supplied with meat products B by a first conveyor assembly C. The meat products B, after passing through the sterilizing device A are discharged onto a second conveyor assembly D, which serves to transport them to a sterile packaging unit E or refrigerated storage space (not shown) if desired.

The meat product sterilizing device A, as may best be seen in FIGS. 1, 2 and 3, includes a table 10 that has a horizontal top 12 that is supported by first and second end pieces 14 and 16, and the end pieces being connected by a pair of side pieces 18. Four legs 20 extend downwardly from the end pieces 14 and 16 and side pieces 18 to support the top 12 at a desired elevation above the floor surface 22.

The top 12 has an elongate, longitudinally extending opening 24 therein through which an elongate tank 26 extends downwardly. Tank 26 as may be seen in FIG. 4 has a bottom 28 that has two laterally spaced side walls 30 extending upwardly therefrom. The bottom 28 is defined by a substantially horizontal flat intermediate portion 28*a* that has two longitudinally spaced sections 28*b* extending upwardly therefrom at an angle in opposite directions.

The tank 26 has horizontal flanges 32 extending outwardly from the side walls 30 and ends thereof, which flanges overlie the top 12 and support the tank therefrom. First and second transverse longitudinally spaced rollers 34 and 36 are secured to first and second transverse shafts 38 and 40, which shafts are journaled in first and second pairs or brackets 42 and 44. The first and second pairs of brackets 42 and 44 are secured to first and second end pieces 14 and 16 respectively as may be seen in FIGS. 1 and 2. The first and second shafts 38 and 40 as may be seen in FIGS. 2 and 3 have longitudinally aligned first and second sprockets 46 and 48 respectively secured thereto by conventional means. The first and second sprockets 46 and 48 are rotatably engaged by an endless link belt 50 that also engages a third sprocket 52. The third sprocket 52 is secured to a shaft 54 that is driven by an electric motor 56 having a gear reduction unit (not shown).

The motor 56 as can best be seen in FIG. 3 is mounted on a bracket 58 that by bolts 60 is supported from one of the side pieces 18, and the motor when so supported having the third sprocket 52 longitudinally aligned with the first and second sprockets 46 and 48. The bolts 60 as shown in FIG. 3, preferably extend through vertical slots 62 formed in the bracket 58, to permit the bracket to be vertically adjusted relative to the supporting side pieces 18. The bracket 58 has an upright 64 secured thereto that supports a slide plate 66 to maintain the belt 50 in engagement with the third sprocket 52.

The first and second rollers 34 and 36 as may best be seen in FIG. 4 rotatably support flat endless belt 68 of substantial width that is preferably formed from a non-electrical conducting material. Belt 68 is of slightly less width than the length of the rollers 34 and 36. The endless belt 68 is of sufficient length that the upper reach 68a thereof slidably rests on the upper surfaces of the central bottom section 28a and the sections 28b on each side thereof.

The belt 68 provides an upper reach 68a that moves from left to right as viewed in FIG. 4, and on which the mean products B are sequentially deposited from the first conveyor assembly C. The side walls 30 of the tank 26 as may be seen in FIGS. 4 and 5 serve to support two laterally spaced electrodes 72 that are of substantial length and depth, with the depth of the electrodes being substantially that of the center portion of the tank 26. The electrodes 72 are formed from an electrical conducting material such as brass, graphite or the like that is not adversely affected by prolonged contact with an aqueous medium such as water or the like. The lower reach 68b of the belt 68 is supported on idling rollers 70 to prevent the weight of the lower reach of the belt causing the upper reach 68a to become taut and raised from sliding contact with the bottom 28 of the tank 26.

Figure 8:
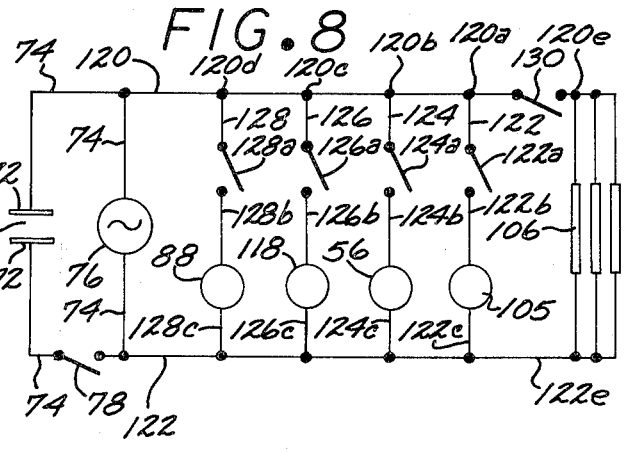
FIG. 8 is the electrical diagram used in conjunction with the assembly illustrated in FIG. 7.

The electrodes 72 are secured to the interior surface of the tank 26 by conventional means, and inasmuch as the tank 26 is preferably formed from an electrical insulating material, the electrodes are electrically insulated from one another. In the event that the tank 26 is formed from a metallic material, the electrodes must be supported therefrom by electrical insulating means (not shown). The electrode 72 as shown in FIG. 8 are connected by conductors 74 to a source of electric power 76. An electric switch 78 is provided, and when closed, completes an electric circuit from the source of electric power 76 to electrodes 72 to establish a zone of eletrical potential 80 therebetween, and through which zone the meat products B are sequentially moved by the upper reach 68a of the belt 68 as the upper reach moves from left to right as viewed in FIG. 4. The electrical potential zone 80 established in the aqueous medium 82 contained in the tank 26 must be of sufficient magnitude to either immediately kill or damage microorganisms in the meat products B to the extent that they cannot reproduce and subsequently die. This killing or damaging of the microorganisms is accomplished by exposing each of the meat products B to the electrical potential zone 80 for not less than a predetermined length of time. The predetermined length of time is dependent upon the rate at which the belt 68 is driven.

The electric current flows between the electrode 72 through the aqueous medium 82, and as a result the aqueous medium tends to be heated. To prevent the aqueous medium 82 being heated, a tubular outlet 83 is connected to the interior of the tank 26 and extends to the suction side 84 of a pump 86 that is driven by an electric motor 88. The discharge of the pump 86 is conducted through a tubular member 90 to a cooler 92 in which the temperature of the aqueous medium is reduced to a desired degree, and the liquid discharge from the cooler 92 being directed through a tubular member 94 into the interior of the tank 26 as may best be seen in FIG. 4. The cooler 92 may be a conventional piece of equipment, such as is normally used in the cooling of water, as for instance a cooling tower, radiator, or the like.

Figure 7:
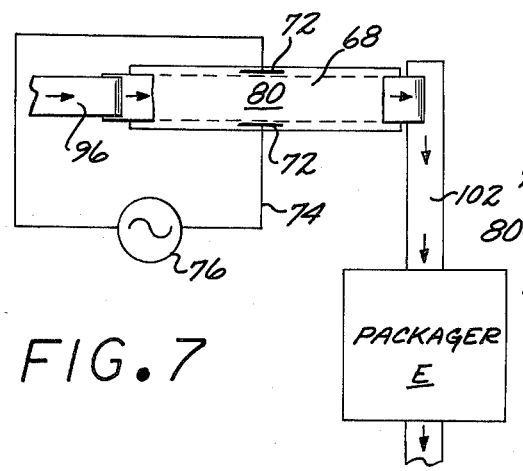
FIG. 7 is a diagrammatic top plan view of the assembly as a whole.

The first conveyor assembly C, as can be seen in FIGS. 2 and 7 includes a flat conveyor belt 96 that is rotatably supported on two identical longitudinally spaced rollers 98 that are rotatably supported from a conventional elongate frame 100. The first conveyor assembly C extends forwardly over the belt 69 of the meat product sterilizing device A, and as a result when the meat products B have moved to the end of the first conveyor assembly C they drop onto the belt 68. In this way, the possibility of a user sustaining electrical shock by contact with the meat product sterilizing device A is eliminated, as there is no physical contact between the first conveyor assembly C and the meat product sterilizing assembly A.

The second conveyor assembly D as may best be seen in FIG. 7 includes a roller supported flat conveyor belt 102 that is normally disposed to the belt 68 of the meat product sterilizing device A and is situated therebelow, and receives the meat products B after they have been sterilized. The conveyor belt 102 transfers the sterilized meat products to the sterile packaging unit E that is of a conventional design.

Figure 5:
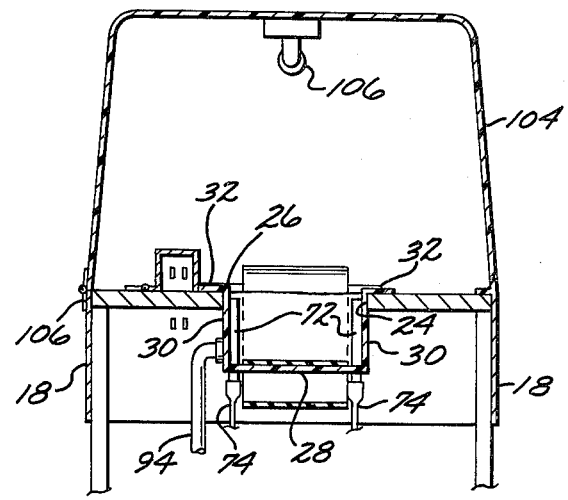
FIG. 5 is an end elevational view of the meat product sterilizing device.

To prevent personnel inadvertently contacting the electrical potential zone 80, the meat product sterilizing device A is provided with a longitudinally extending inverted channel shaped cover 104 as can best be seen in FIG. 5 and the channel shaped cover being pivotally secured to one of the side pieces 18 by hinges 106. The channel shaped cover 104 as can best be seen in FIG. 1 is open at both ends to permit entry and discharge of the meat products B into and from the meat product sterilizing device A. The air inside the cover 104 is maintained in a sterile position due to the cover 104 on the interior thereof supporting a number of ultraviolet lamps 106. The rays from the ultraviolet lamps 106 kill bacteria spores or other microorganisms that might enter the open ends of the cover 104, and come to rest on one of the meat products B after the same has been sterilized by passing through the electrical potential zone 80. The electric switch 78 is so operatively associated with the cover 104 that the switch is in the closed position only when the cover is in the closed position. Thus, the possibility of personnel inadvertently contacting the electrical potential zone 80 is eliminated. The potential of the zone 80 is preferably 220 or 440 volts and could be lethal if contacted by personnel.

Figure 6:
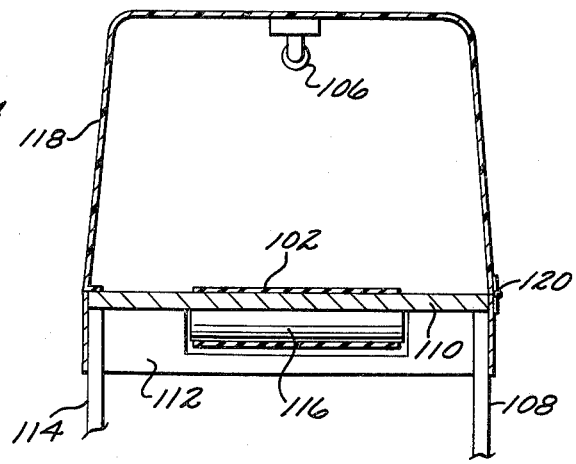
FIG. 6 is a transverse cross sectional view of the second conveyor.

The first conveyor assembly C is driven by a geared down electric motor 105, which motor drives the roller 58 to move the upper reach of the conveyor belt 96 towards the sterilizing device A. The second conveyor assembly D as can be seen in FIGS. 1 and 6 includes a table 108 that includes a horizontal table 110 that is supported at the desired elevation on a rectangular angular frame 112 from which a number of legs 114 extend downwardly. Two transverse laterally spaced rollers 116 are rotatably supported by conventional means (not shown) from the top 110 and with one of these rollers being driven by a geared down electric motor 118. The upper reach of the conveyor belt 102 receives sterilized food products B from the right hand end of the conveyor belt 68 as viewed in FIG. 2, and transports these food products to the packaging unit E as may be seen in FIG. 7.

The second conveyor assembly D also has an inverted channel shaped cover 118 that is pivotally supported from the top 110 by a number of hinges 120 as shown in FIG. 6. The cover 118 like the cover 104 supports one or more ultraviolet lights 106 from the upper portion thereof to maintain the air within the cover 118 in a sterile condition so that meat products being carried on the conveyor belt 102 to the packaging unit E will not be contaminated by airborne microorganisms.

The source of electric power 76 as can best be seen in FIG. 8 supplies power to two conductors 120 and 122. The conductors 120 having a number of junction points 120a, 120b, 120c, 120d, formed thereon that have electrical conductors 122, 124, 126, 128 extending therefrom to electrical switches 122a, 124a, 126a, 128a. The switches 122a, 124a, 126a and 128a are connected by conductors 122b, 124b, 126b and 128b to motors 106, 56, 118 and 88, and these motors also being connected by conductors 122c, 124c, 126c and 128c to junction points on the conductor 122. When the switches 122a, 124a, 126a and 128a are closed, the respective motors 106, 56, 118 and 88 associated therewith are energized to drive components of the invention.

The ultraviolet members 106 are energized by conductors extensions 120e and 122e that are connected to conductors 120 and 122 as shown in FIG. 8. Conductor 120e includes an electric switch 130 which permits the ultraviolet lights 106 to be energized only when this switch is closed. The invention above described is particularly adapted for use in sterilizing meat products such as seafood, froglegs and the like. From experience it has been found that in using the above described invention to sterilize froglegs, the grogs are first killed with the legs being removed and the skin removed therefrom. The legs are tied together in pairs and then run through the device, with the legs being exposed to the electrical potential zone for approximately 2 seconds. When the electrical potential zone is 220 and 440 Volts such an exposure is sufficient to kill salmonella, and other microorganisms that may contaminate the froglegs, and render the froglegs suitable for human consumption. The speed of the upper reach of the belt 68a is so corrolated with the magnitude of the electrical potential between the electrode 72 as the meat products B to be sterilized passes through the electrical potential zone, all microorganisms in the meat product are either killed immediately or damaged so that they subsequently die. In either event the meat is steril and suitable for human consumption.

The use and operation of the present invention has been explained in detail previously and need not be repeated.

I claim:

1. An apparatus for sterilizing microorganism infected meat products that includes:
   a. an elongate having first and second ends and a bottom, with said tank capable of containing a liquid aqueous medium therein;
   b. first and second rotatably supported rollers adjacent said first and second ends of said tank;
   c. an endless flexible belt of a non-electrical conducting material rotatably supported from said first and second rollers, said belt including an upper reach, said belt of such length and such weight that said upper reach is disposed below the surface of said liquid aqueous medium in said tank, said upper reach serving to support said meat products deposited thereon adjacent said first end of said tank;
   d. two laterally spaced electrodes disposed in said tank intermediate said first and second ends thereof, with said electrodes of substantial length and said electrodes disposed on opposite sides of said belt;
   e. first means for supporting said electrodes in a fixed relationship with said tank and in electrically insulated relationship with one another;
   f. second means for driving at least one of said first and second rollers to move said belt at not greater than a first speed and in a direction in which said meat products are transported from said first end of said tank towards said second end thereof;
   g. third means for applying electrical energy to said electrodes to establish an electrical potential zone therebetween in said aqueous medium through which said upper reach of said belt and said meat products supported thereon travel, said electrical potential zone of sufficient magnitude to render microorganisms in said meat products permanently inactive when said meat products are exposed to said electrical potential zone for greater than a first predetermined period of time, and the speed of said belt and the length of said electrodes being so selected that each of said meat products when transported on said upper reach of said belt from said first end of said tank to said second end of said tank is subjected to said electrical potential zone for greater than said first period of time and said microorganisms therein are rendered permanently inactive as a result thereof.

2. An apparatus as defined in claim 1 which further includes:
   h. fourth means for sequentially receiving and moving said meat products to a first location after said meat products are discharged from said upper reach of said belt adjacent said second end of said tank;
   i. fifth means for sequentially packaging said meat products in sterile containers at said first location; and
   j. sixth means for maintaining said meat products in a sterile condition after they have passed through said electrical potential zone and until they are placed in said sterile containers.

3. An apparatus as defined in claim 1 which further includes:
   h. fourth means for maintaining said aqueous medium at a predetermined temperature.

4. An apparatus as defined in claim 1 which further includes:
   h. fourth means for circulating said liquid aqueous medium out of and into said tank; and
   i. fifth means for cooling said liquid aqueous medium as it circulates out of said tank and into said tank to the extent that said aqueous medium in said tank is maintained at substantially said predetermined temperature.

5. An apparatus for sterilizing microorganism infected meat products, which microorganisms are of a type that are rendered incapable of reproducing after being subjected to an electrical potential of a predetermined magnitude for a predetermined length of time, which apparatus includes:
   a. an elongate tank capable of containing a liquid aqueous medium said tank having first and second ends;
   b. two elongate laterally spaced electrodes disposed in said tank intermediate said first and second ends;
   c. first means for supporting said electrodes in a fixed position relative said tank and electrically from one another;
   d. second means for supplying electric energy to said electrodes to establish a zone of electrical potential therebetween of at least said predetermined magnitude when said tank contains said liquid aqueous medium and said electrodes are at least partially immersed therein; and
   e. third means for sequentially moving said meat products longitudinally in said tank from said first to said second end thereof and immersed in said liquid aqueous medium when said meat products pass through said zone of electrical potential, with said second means moving said meat products at such a rate that said meat products are exposed to said zone of electrical potential for at least said predetermined length of time.

* * * * *